United States Patent [19]
Mochizuki et al.

[11] Patent Number: 6,105,849
[45] Date of Patent: Aug. 22, 2000

[54] FRICTION WELDING OF ALUMINUM ALLOY HOLLOW MEMBERS

[75] Inventors: Hiroyuki Mochizuki; Harumichi Hino, both of Ihara-gun; Masayuki Kobayashi, Tokyo, all of Japan

[73] Assignee: Nippon Light Metal Company Ltd., Tokyo, Japan

[21] Appl. No.: 09/201,491

[22] Filed: Nov. 30, 1998

[30] Foreign Application Priority Data

Dec. 2, 1997 [JP] Japan ..................................... 9-331523

[51] Int. Cl.$^7$ .............................. B23K 20/12; B60G 3/12; B63H 23/34; F16D 1/00
[52] U.S. Cl. .................... 228/112.1; 228/102; 228/114.5; 280/124.133; 403/183; 440/83
[58] Field of Search ............................. 228/114.5, 112.1, 228/2.1, 113, 114, 102, 103, 234.1; 403/183; 440/83; 280/124.133

[56] References Cited

U.S. PATENT DOCUMENTS

| | | | |
|---|---|---|---|
| 3,693,238 | 9/1972 | Hoch et al. | 29/470.3 |
| 4,594,020 | 6/1986 | Hughes | 403/343 |
| 4,711,008 | 12/1987 | Nakamura | 29/156.8 P |
| 4,757,932 | 7/1988 | Benn et al. | 228/2 |
| 5,771,737 | 6/1998 | Yaegashi | 72/367 |
| 5,919,094 | 6/1999 | Yaegashi | 464/162 |

FOREIGN PATENT DOCUMENTS

| | | |
|---|---|---|
| 0920948A2 | 9/1999 | European Pat. Off. . |
| 5-96385 | 4/1993 | Japan . |
| 9-13139 | 1/1997 | Japan . |
| 410193142A | 7/1998 | Japan . |
| 11156562A | 6/1999 | Japan . |

OTHER PUBLICATIONS

The Metals Handbook Ninth Edition, vol. 6, pp. 719–728, 1983.

*Primary Examiner*—Patrick Ryan
*Assistant Examiner*—Kiley Stoner
*Attorney, Agent, or Firm*—Reed Smith Shaw & McClay LLP

[57] ABSTRACT

The root shape of a flash formed in the friction-welded joint is controlled by introducing an upset delay time interposed between termination of the friction step and commencement of the upset step and by controlling the upset displacement speed. This provides a friction-welded joint having a tensile strength and a fatigue strength which are comparable with those of TIG- or MIG- welded joints and enables aluminum alloy hollow members to be produced by friction welding instead of TIG or MIG welding. Typically, the upset delay time is 0.4 to 0.8 sec and the upset displacement speed is 5.0 to 70.0 mn/sec to form a flash having a flash root radius of 0.5 mm or more and a flash root angle of 75° or less.

18 Claims, 8 Drawing Sheets

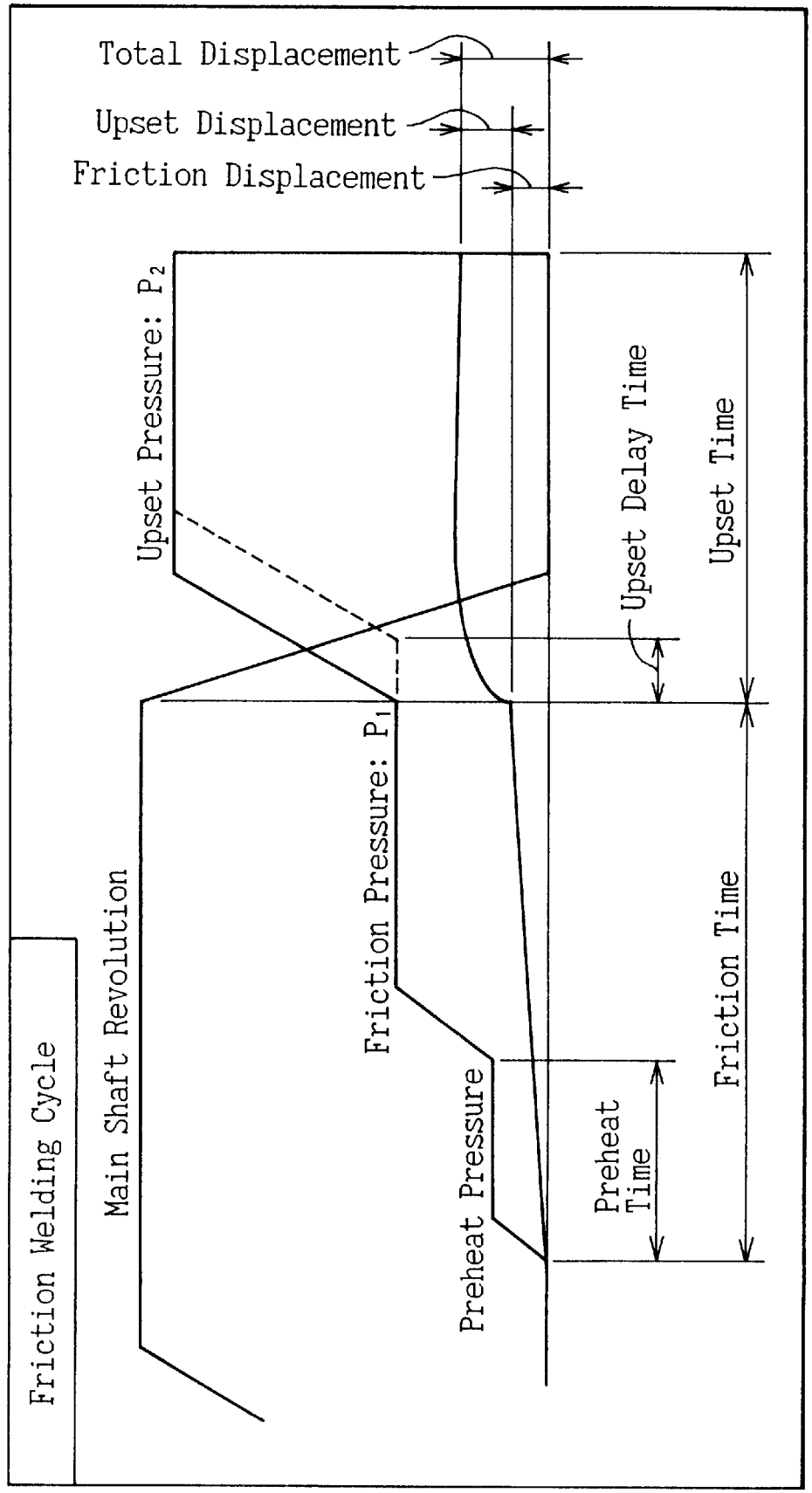

Fig.3(1)
Conventional
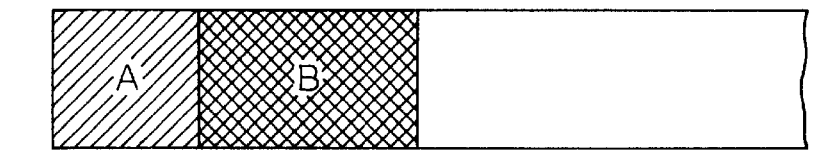
Welding Center
Invention
Welding Center
Excessive Heat Input
Welding Center
Temperature Distribution Before Upset

Fig.5(a) Conventional
Fig.5(b) Invention
Fig.5(c) Invention
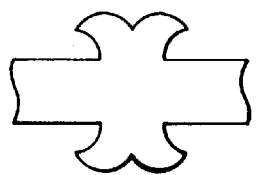
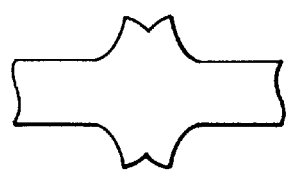
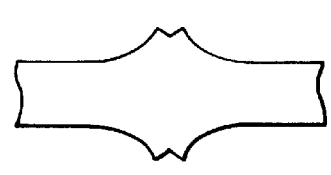
Fig.6
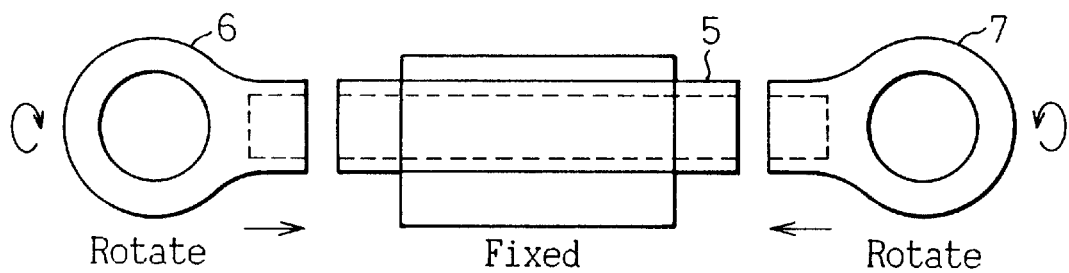
Fig.7
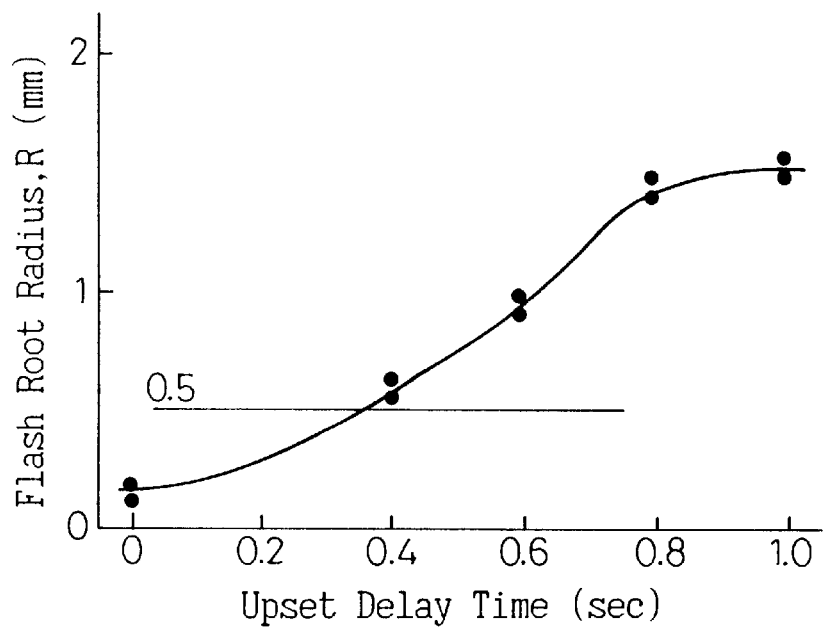

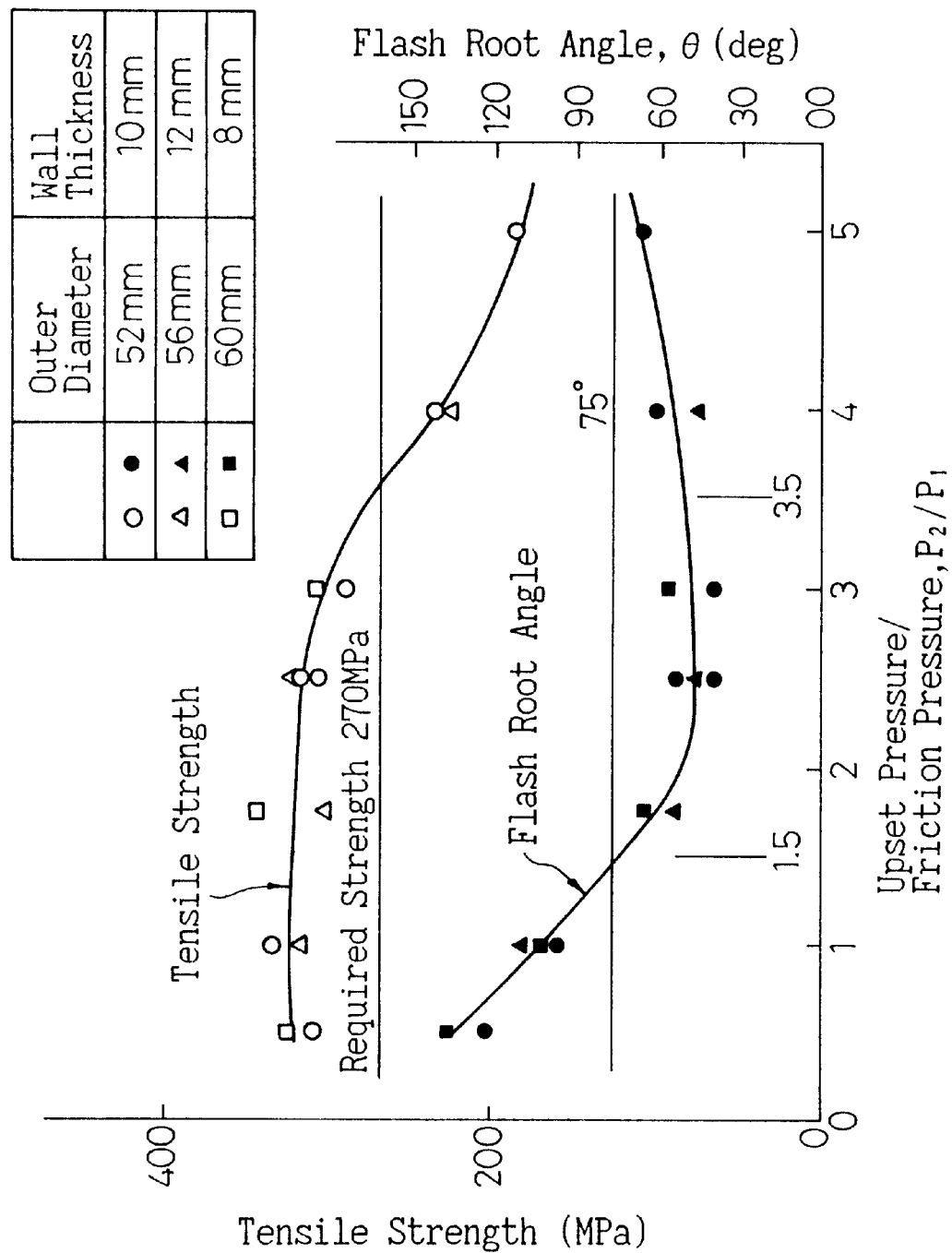

6,105,849

FRICTION WELDING OF ALUMINUM ALLOY HOLLOW MEMBERS

BACKGROUND OF THE INVENTION

1. Field of the Invention

The present invention relates to a process of friction-welding aluminum alloy hollow members, a friction-welded joint, and vehicle parts, such as torque rods, propeller shafts and suspension links or other links, having the joint, in which good tensile strength, fatigue strength and other mechanical properties are ensured.

2. Description of the Related Art

The friction welding process includes the steps of making members abut each other end to end, causing friction between the abutting ends of the members, typically by relative rotation between the abutting ends, to generate friction heat for heating the abutting ends to a welding temperature, and then upsetting the abutting ends by pressing the abutting ends against each other whereby a flash is extruded from the abutting ends.

Friction welding is generally used in many applications because various kinds of materials are bonded without the necessity of special skills as required in MIG or TIG welding. Friction welding also advantageously provides bonding with reduced welding defects and ensures a stable quality. Because of these advantages, friction welding is frequently used for bonding ferrous or iron-based materials.

However, the friction-welded joint unavoidably includes a flash having a root which acts as a stress concentrator to reduce the fatigue strength. Moreover, it is more likely in aluminum-based materials than in ferrous materials that a broader heat affected zone is formed to cause softening of the material because of a higher heat conductivity in comparison with that of ferrous materials. The presence of a flash as a stress concentrator in the heat affected zone, together with the joint material being softer than a base metal, causes cracking, breakage, etc. to occur from the flash root to lower the fatigue strength of the joint. Thus, there remain problems to be solved when friction-welding members of an aluminum-based material and many solutions have been proposed to this end.

For example, Japanese Unexamined Patent Publication (Kokai) No. 5-96385 proposed a process in which the upset timing is set before the members to be friction-welded are brought into contact with each other and an upset pressure is applied to the members for an extremely short time until a rotary motor is stopped. This reduces the size of a heat affected zone, suppresses softening of the base metal near the welded joint and provides a joint having an improved mechanical strength.

However, regulation of the upset timing alone cannot effectively control formation of a flash acting as a stress concentrator. Flashes on the outer surface of a friction-welded product can be relatively easily removed by machining. However, flashes on the inner surface of a friction-welded tubular product cannot actually removed. For example, lightweight vehicle torque rods of aluminum alloys are used to replace those of ferrous materials and are produced by bonding ring form tips at both ends of a tubular cylinder but friction welding is not used because it reduces the fatigue strength. This also applies in vehicle propeller shafts and vehicle links, such as suspension links having a tubular cylinder and tips bonded at both ends of the cylinder.

SUMMARY OF THE INVENTION

The object of the present invention is to solve the above-mentioned problems of the conventional technology and to provide a friction-welded joint having improved tensile and fatigue strengths by controlling the friction welding conditions so that a flash having a controlled root shape is formed on the friction-welded joint.

To achieve the object according to the first aspect of the present invention, there is provided a process of friction-welding aluminum alloy hollow members, comprising the steps of:

making aluminum alloy hollow members abut each other end to end;

causing friction between the abutting ends by relative rotation between the ends to generate friction heat, thereby heating the abutting ends to a welding temperature; and upsetting the heated, abutting ends by pressing the ends against each other to extrude a flash therefrom, wherein:

the flash has a flash root radius of 0.5 mm or more and a flash root angle of 75 deg or less, the flash root radius and the flash root angle being defined in a plane which contains an axis of the pressing, the flash root radius being a radius of curvature of a surface of the flash in a portion rising from the members and the flash root angle being an acute angle between the surface of the flash and the axis of the pressing.

Preferably, an upset delay time is interposed between completion of the step of causing friction and commencement of the step of upsetting so as to achieve the flash root radius and the flash root angle.

According to the second aspect of the present invention, there is also provided a process of friction-welding aluminum alloy hollow members, comprising the steps of:

making the members abut each other end to end;

causing friction between the abutting ends by relative rotation between the ends to generate friction heat, thereby heating the abutting ends to a welding temperature; and upsetting the heated, abutting ends by pressing the ends against each other to extrude a flash therefrom, wherein:

an upset delay time of from 0.4 to 0.8 sec is interposed between completion of the step of causing friction and commencement of the step of upsetting and the step of upsetting includes applying an upset pressure to the members at an upset displacement speed of from 5.0 to 70.0 mm/sec so as to form a flash having a flash root radius of 0.5 mm or more and a flash root angle of 75 deg or less, the flash root radius and the flash root angle being defined in a plane which contains an axis of the pressing, the flash root radius being a radius of curvature of a surface of the flash in a portion rising from the members and the flash root angle being an acute angle between the surface of the flash and the axis of the pressing.

Preferably, in the second aspect, the step of causing friction between the abutting ends is carried out at a friction pressure of 14.7 to 58.8 MPa, a ratio of a friction displacement to a wall thickness of the members of 0.15 to 0.7 and a revolution of 500 to 3000 rpm and the step of upsetting includes application of an upset pressure of 1.5 to 3.5 times the friction pressure.

According to the third aspect, the present invention also provides a friction-welded joint of aluminum alloy hollow members, wherein the joint is produced by a process according to the second aspect of the present invention and has a flash having a flash root radius of from 0.5 mm or more and a flash root angle of from 75 deg or less.

According to the fourth aspect of the present invention, the present invention provides a vehicle torque rod, a vehicle propeller shaft and a vehicle link such as a suspension link, of an aluminum alloy comprising a hollow circular cylinder and tips having a hollow circular end, wherein the tips are respectively bonded to both ends of the hollow circular cylinder at the hollow circular ends of the tips by a process of friction welding according to any one of the first and second aspects of the present invention.

BRIEF DESCRIPTION OF THE DRAWINGS

FIG. 1 is a graph schematically showing variations in the process parameters during one cycle of a friction welding;

FIGS. 5(a), 5(b) and 5(c) show friction-welded joints having different flash shapes according to the temperature distribution of the weld zone, in a cross-sectional view along an axis of upsetting;

FIG. 6 shows a torque rod produced by friction welding according to an embodiment of the present invention;

FIG. 7 is a graph showing the influence of the upset delay time on the flash root radius, R;

FIG. 13 is a graph showing the relationship between the ratio of upset pressure $P_2$/friction pressure $P_1$ and the tensile strength.

In FIGS. 9 to 13, the fatigue strength and the tensile strength refer to a stress per unit sectional area of the base material.

DESCRIPTION OF THE PREFERRED EMBODIMENTS

Figure 2A:
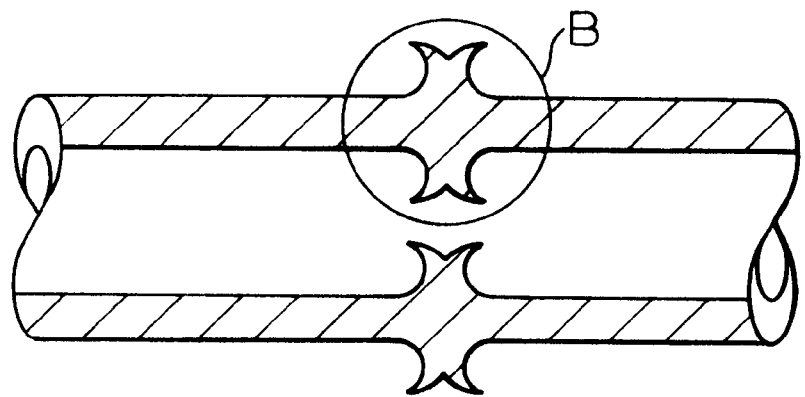
FIG. 2(A) shows a friction-welded joint having a flash extruded therefrom, in a cross-sectional view along an axis of upsetting

The friction welding cycle generally includes varying the process parameters in the manner as shown in FIG. 1.

Specifically, a heat necessary for effecting welding is provided in the following sequence. In a preheat step, one of the members to be welded is fixed on a stationary holder while the other is rotated while being clamped on a rotary main shaft, both are made mutually abut end to end and are pressed against each other at a preheat pressure to heat the abutting ends to a preheat temperature. The pressure is then raised to a friction pressure $P_1$ to further heat the abutting ends or bonding interface to a temperature necessary for effecting welding.

To effectively heat the bonding interface, the present invention uses a main shaft revolution of 500 to 3000 rpm and a friction pressure $P_1$ 14.7 to 58.8 MPa. If the revolution is less than 500 rpm, or if the friction pressure is less than 14.7 MPa, it takes a long time to heat the bonding interface to the welding temperature. A long heating time causes, particularly in aluminum-based materials having a high heat conductivity, the friction heat to diffuse away from the bonding interface toward the base metal with the result that the heat generated by friction is not effectively utilized for welding but undesirably softens the base metal. On the other hand, if the revolution is more than 3000 rpm, or if the friction pressure $P_1$ is more than 58.8 MPa, not only special equipment therefor is required but also the heated bonding interface fails to have a stable temperature distribution.

In a friction step, the members to be welded are forced against each other for a friction displacement, which depends on the wall thickness of the hollow members to be welded and is preferably adjusted so that the ratio of the friction displacement/the wall thickness is 0.15 to 0.7. If the friction displacement/the wall thickness is less than 0.15, the friction displacement is too small with respect to the wall thickness and the welding process is terminated before oxides, adsorbed substances, pickups, etc. are completely removed from the bonding interface, so that the welded joint has poor tensile strength. On the other hand, if the friction displacement/the wall thickness is more than 0.7, a large heat is generated by friction and causes an excessive heat input to the base metal, so that a required tensile strength cannot be obtained because of softening of the base metal.

To terminate the friction step, the rotation of the main shaft is terminated. In the conventional friction welding, the friction step is directly followed by an upset step, in which an upset pressure $P_2$ is applied to the members having the heated abutting ends. In contrast, the present invention inserts an upset delay time between termination of the friction step and commencement of the upset step to control the shape of the flash root: i.e., the friction step is not directly followed by the upset step but is indirectly followed by the upset step via an upset delay time.

The upset pressure $P_2$ is adjusted with respect to the friction pressure $P_1$ so that the ratio $P_2/P_1$ is from 1.5 to 3.5. If $P_2/P_1$ is greater than 3.5, the upset pressure is excessively high such that a fresh surface generated in the bonding interface during the friction step and the adjacent softened portion are extruded away to form a flash and the members are bonded at an interface not heated sufficiently. As a result, the friction-welded joint has poor tensile strength. On the other hand, if $P_2/P_1$ is smaller than 1.5, a high temperature, fluid material alone forms a flash having a sharp root at which the flash is raised from the base metal, with the result that the friction-welded joint has poor fatigue strength.

The present inventors studied the flash shape and the friction welding conditions to provide a friction-welded joint having a tensile strength and a fatigue strength which are comparable with those of TIG- or MIG-welded joints, even if the flash is left unremoved. Specifically, the study was focused on the friction welding conditions which provide a joint having a tensile strength of 270 MPa or more and a fatigue strength ($10^5$ cycles) of 70 MPa. As a result, the present inventors found that the shape of a flash formed on the friction-welded joint has a significant influence on the fatigue strength.

Figure 2B:
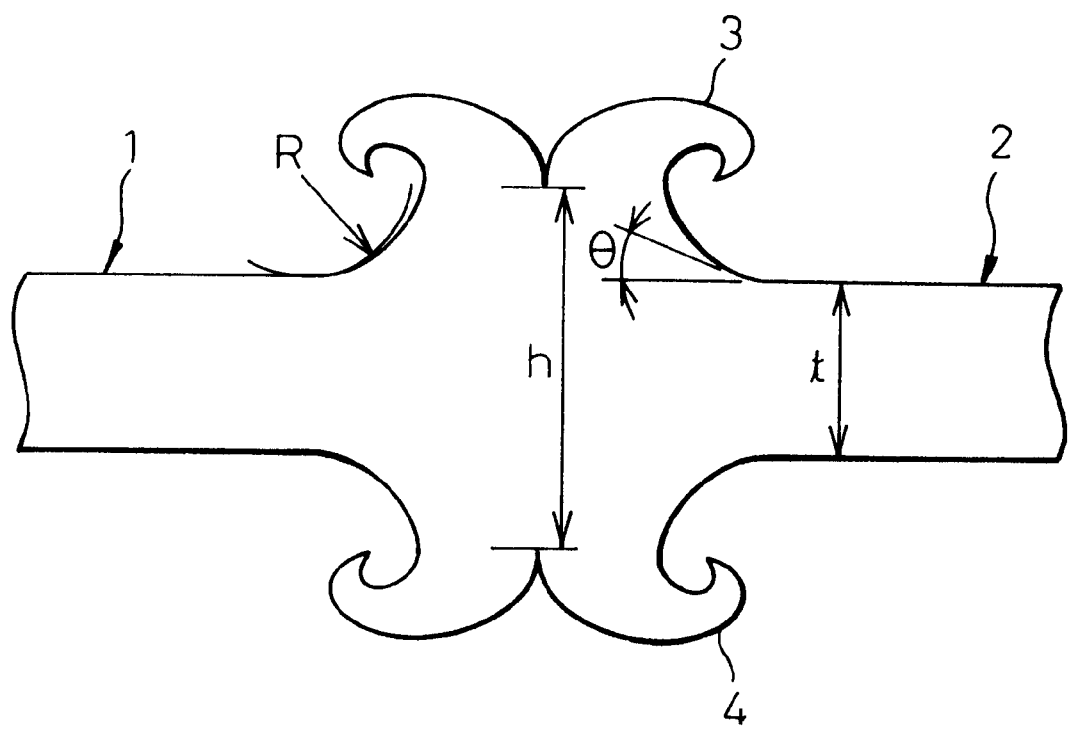
FIG. 2(B) is a partial enlarged view of the portion "B" of FIG. 2(A)

Referring to FIG. 2, flashes 3 and 4 are formed on the friction-welded joint during friction welding of the members 1 and 2. According to the studies conducted by the present inventors, stress concentration at the root of the flashes 3 and 4 is mitigated and the friction-welded joint has an improved fatigue strength when the flash root radius R is 0.5 mm or more, preferably 1.5 mm or more and the flash root angle θ is 75 deg or less, preferably 45 deg or less.

The flash root radius and the flash root angle are defined in a plane which contains an axis of the pressing for upsetting, in which the flash root radius is a radius of curvature of a surface of the flash in a porion rising from the members to be welded (the base metal) and the flash root angle is an acute angle between the surface of the flash and the axis of the pressing.

It is not necessary to remove flashes 3 and 4 when the above-specified flash root radius R and flash root angle θ provide a joint having good fatigue strength. This is very advantageous when aluminum alloy pipe members 1 and 2 are friction-welded together, in which the flash 3 on the outer surface of the welded pipe members 1 and 2 can easily be removed but the flash 4 on the inner surface of the welded pipe members 1 and 2 cannot actually be removed. This means that friction welding can successfully be applied to producing a torque rod and other various types of hollow members because good mechanical properties are achieved without removing flashes on both sides of the wall, particularly the flash on the inner side.

The present inventors conducted various experiments and found that the flash root radius of 0.5 mm or more and the flash root angle of 75 deg or less are the conditions for effectively improving the fatigue strength and are achieved by a controlled friction welding process in which, after friction is caused between the members 1 and 2, an upset delay time of from 0.4 to 0.8 sec is introduced before upsetting at a regulated upset displacement speed of from 5.0 to 70.0 mm/sec.

The upset delay time is a time interval interposed between termination of the friction step and commencement of the upset step, after which time the friction pressure is switched to the upset pressure (FIG. 1), and allows a controlled shift to the upset step with a controlled size of the heat affected zone in relation to the heat input to the members 1 and 2 achieved during the friction step. The upset delay time is within the range of from 0.4 to 0.8 sec to properly adjust the heat affected zone size in relation to the heat input.

The upset displacement speed means a speed at which the members to be welded are forcibly further moved against each other during the upset step and is one of the control factors influencing the shape of the flashes 3 and 4 formed during the upset step. When the upset delay time is within the range of from 0.4 to 0.8 sec while the upset displacement speed is within the range of from 5.0 to 70.0 mm/sec, an friction-welded joint having improved tensile strength of 270 MPa or more and fatigue strength ($10^5$ cycles) of 70 MPa or more is achieved.

It has been clarified that the shape of the flashes 3 and 4 is varied by the upset delay time and the upset displacement speed for the following reasons.

The friction welding process includes softening the material in the portion at and near the abutting ends, or the bonding interface, by the heat generated by the friction step, which is then switched to the upset step in which the softened interface material is extruded to form flashes 3 and 4 and the members 1 and 2 are bonded via a fresh interface.

Figure 3:
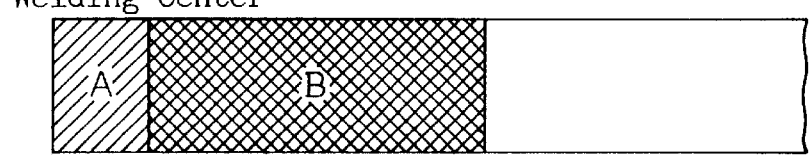
FIGS. 3(1) to 3(3) show a higher temperature region "A" at, or adjacent to, a material end to be welded (the left end) and a lower temperature region "B" in which the material plastically deforms during upsetting, of a material after the friction step and before the upset step, for different friction conditions used in (1) the conventional process, (2) the inventive process, and (3) a process in which excessive friction heat is generated, in a cross-sectional view along an axis of upsetting.
Figure 3:
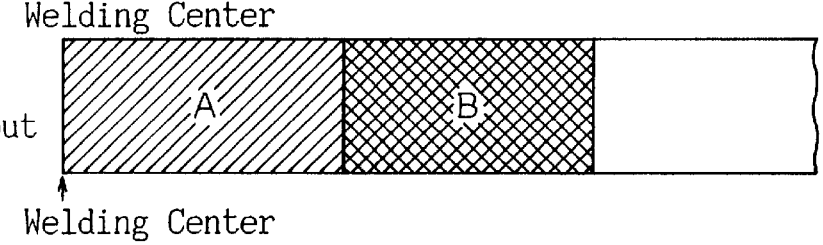

In the conventional friction welding, each of the members having been heated by friction has a higher temperature region "A" in the vicinity of the bonding interface as shown in FIG. 3(1) with an adjacent lower temperature region "B" heated by heat conduction from the region "A". The region "A" has a fluidity sufficient to be immediately extruded upon shift to the upset step and forms the leading part of a flash. The region "B" is no sufficiently fluid but is gradually plastically deformed under the upset pressure during progress of the upset process to form the subsequent part of a flash including the flash root. In this case, the temperature is distributed as shown in FIG. 4 by the curve (1) along the direction from the welding center (the bonding interface) toward the other end of the member.

Under this temperature distribution, an instantaneous shift to the upset mode immediately causes the region "A" to be extruded as a flash. The region "B" is small in size and only allows a small amount of the material to be plastically deformed causing formation of a flash sharply rising from the base material and having a small flash root radius R and a large flash root angle θ as generally shown in FIG. 5(a). The sharp flash is likely to cause stress concentration at the flash root and reduces the fatigue strength of the friction-welded joint.

Figure 4:
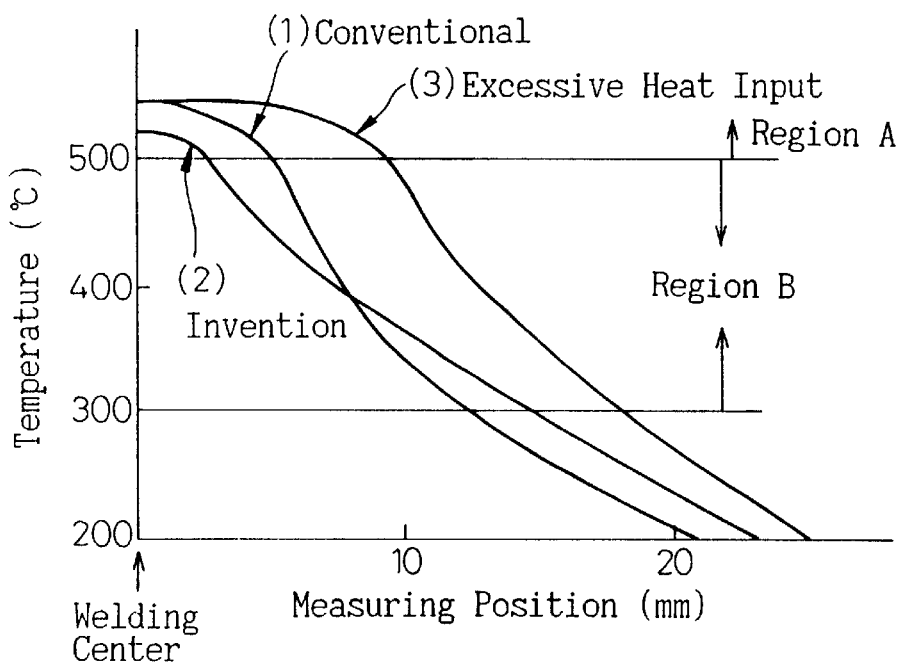
FIG. 4 is a graph schematically showing the temperature distributions along the direction from the welding center (the material end to be welded) toward the other end of the material for the friction conditions corresponding to those of FIGS. 3(1) to 3(3)

In contrast, according to the present invention, an upset delay time of from 0.4 to 0.8 sec is introduced after termination of the friction step to allow heat conduction from the region "A" toward the other end of the member to heat the base material adjacent to the original region "A" while heat is also dissipated from the region "A" by emission, so that the region "A" is narrowed while the region "B" is broadened as shown in FIG. 3(2) and the temperature distribution is represented by the curve (2) in FIG. 4.

Under this temperature distribution, the broadened region "B" allows an increased amount of the material to be plastically deformed and application of an upset pressure to the members 1 and 2 leads to formation of a flash having a large flash root radius R and a small flash root angle θ, as generally shown in FIG. 5(b). If the upset delay time is longer than 0.8 sec, the temperature drop of the region "A" is too large to provide a joint having good tensile strength. On the other hand, if the upset delay time is less than 0.4 sec, the introduction of the upset delay time provides no substantial effect.

The upset displacement speed has also an influence on the flash shape and is specified within the range of from 5.0 to 70.0 mm/sec to facilitate plastic deformation over the entire region "B" allowing formation of a flash having a shape providing a substantial increase in the effective sectional area of the welded joint as generally shown in FIG. 5(c). As a result, the joint has an increased flash root radius R and a reduced flash root angle θ.

It was expected that the plastically deformable region "B" would also be broadened by increasing the heat input by friction. However, if an excessive heat input is provided during the friction step, the region "A" is only broadened whereas the region "B" is maintained substantially unchanged as shown in FIG. 3(3) with respect to the conventional condition of FIG. 3(1), and in this case, the temperature distribution has a form as shown by the curve (3) in FIG. 4.

Under this temperature distribution, application of the upset pressure only causes formation of a flash in an increased amount and having a flash root radius and a flash root angle which are substantially the same as those obtained by conventional friction welding.

EXAMPLES

Referring to FIG. 6, tip members 6 and 7 were friction-welded to the opposite ends of a hollow circular cylindrical member 5 according to the present invention in the following sequence.

The cylindrical member 5 was cut in a selected length from an extruded tube of an aluminum alloy having the chemical composition of 1.28 wt % Si, 1.03 wt % Mg, 0.80 wt % Cu, 0.16 wt % Fe, 0.40 wt % Mn, 0.40 wt % Cr, 0.01 wt % Zn, 0.03 wt % Ti and the balance substantially of Al. The tips 6 and 7 were a forged product of an aluminum alloy having the same chemical composition as above. The cylinder 5 and the tips 6 and 7 were solution-treated at 530° C. followed by water cooling and were aged at 175° C. for 8 hours. The cylinder 5 over the entire length and the tips 6 and 7 on one end were machined to have an outer diameter of 52 mm and a wall thickness of 10 mm for friction welding.

Friction welding was performed in such a manner that the cylinder 5 was fixed on a stationary holder while the tips 6 and 7 were rotated by being clamped on a rotary main shaft and were welded simultaneously to the opposite ends of the cylinder 5, respectively, at a friction pressure $P_1$ of 29.4 MPa, a friction displacement of 3 mm, an upset pressure $P_2$ of 78.4 MPa, with a main shaft revolution fixed to 1500 rpm, while the upset delay time and the upset displacement speed were varied as summarized in Table 1. The influence of the upset delay time and the upset displacement speed on the tensile strength and the fatigue strength of the friction-welded joint in the as-welded state were studied.

Table 1 also summarizes the mechanical properties of the friction-welded joint. The fatigue strength was measured in a tension-compression mode with a stress ratio R =−1. It can be seen from Table 1 that the fatigue strength of the friction-welded joint is significantly improved by the combined use of the introduction of an upset delay time and the control of the upset displacement speed. The tensile strength successfully exceeds the target value of 270 MPa, although it is a little lower than that obtained by the conventional process.

TABLE 1

| Test No. | Upset delay time (sec) | Upset displacement speed (mm/sec) | Fatigue strength (MPa) | Tensile strength (MPa) |
|---|---|---|---|---|
| 1 | None | 95 | 53 | 342 |
| 2 | 0.6 | 70 | 70 | 327 |
| 3 | 0.6 | 30 | 97 | 312 |
| 4 | 0.6 | 8 | 100 | 312 |
| 5 | 0.6 | 5 | 100 | 310 |
| 6 | 0.6 | 4 | 95 | 265 |
| 7 | 0.2 | 30 | 57 | 337 |
| 8 | 0.4 | 30 | 80 | 320 |
| 9 | 0.8 | 30 | 100 | 310 |
| 10 | 1.0 | 30 | 89 | 265 |

The underlined data are outside the specified range.

To clarify that the fatigue strength varies with the upset delay time and the upset displacement speed due to the flash shape, the flash root radius R and the flash root angle θ were studied in relation to the upset delay time and the upset displacement speed.

Figure 8:
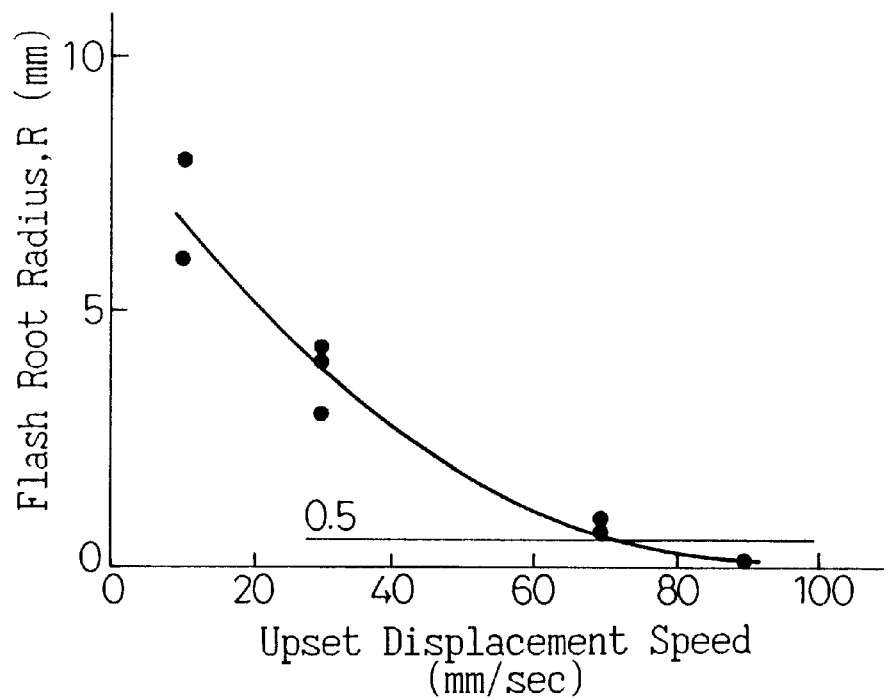
FIG. 8 is a graph showing the influence of the upset displacement speed on the flash root radius, R.
Figure 9:
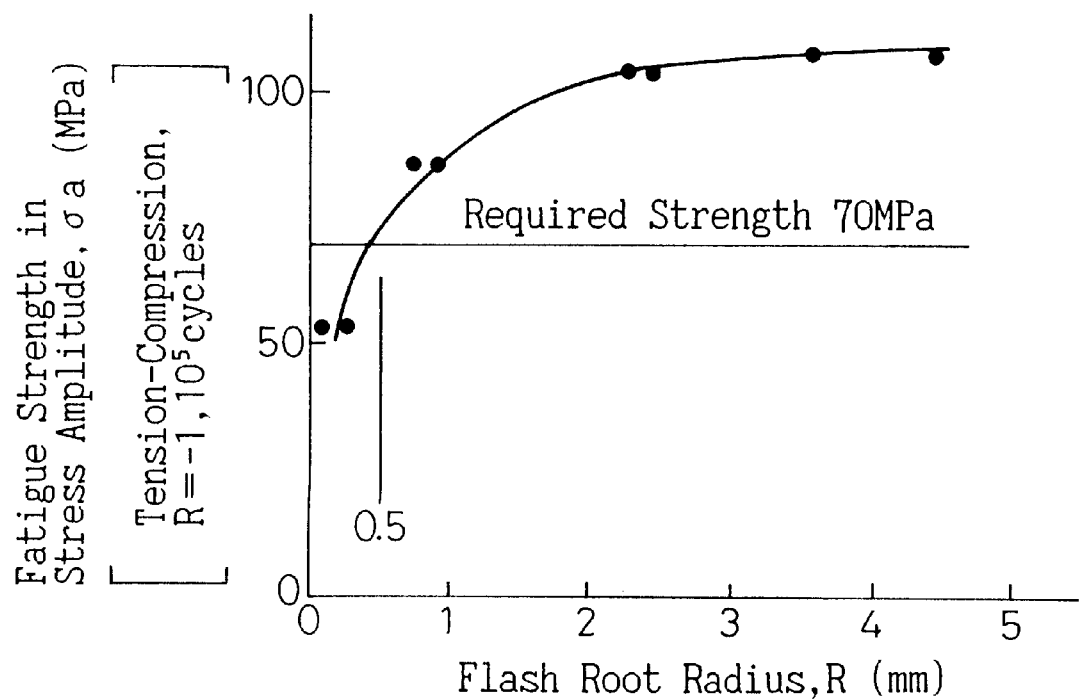
FIG. 9 is a graph showing the variation in the fatigue strength as a function of the flash root radius, R.

The flash root radius R increases as the upset delay time increases as shown in FIG. 7 and decreases as the upset displacement speed increases as shown FIG. 8. When the flash root radius R is 0.5 mm or more, the friction-welded joint has a fatigue strength of 70 MPa or more as shown in FIG. 9. The combined relationships between FIGS. 7, 8 and 9 show that, to provide a friction-welded joint having a fatigue strength comparable with those of TIG- or MIG-joints, it is necessary that the upset delay time be 0.4 sec or more and the upset displacement speed be 70.0 mm/sec or less. However, when the upset delay time is more than 0.8 sec, the tensile strength of the joint is reduced because upset is effected on the bonding interface in which the temperature achieved by friction has been substantially lowered. Similarly, when the upset displacement speed is less than 5 mm/sec, the tensile strength of the joint is also reduced for the same reason as above.

Figure 10:
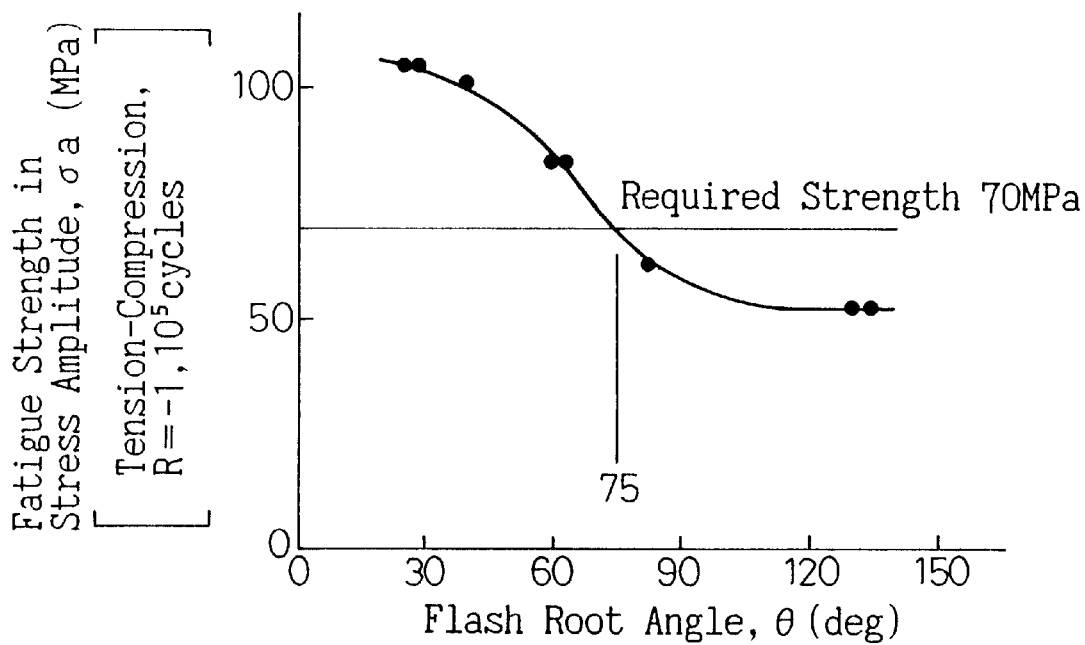
FIG. 10 is a graph showing the variation in the fatigue strength as a function of the flash root angle, θ.

Referring to FIG. 10, when the flash root angle is 75 deg or less, the friction-welded joint has a fatigue strength exceeding the target value of 70 MPa. The flash having a root angle of 75 deg or less is formed when the upset delay time is 0.2 to 0.9 sec and the upset displacement speed is 5 to 85 mm/sec.

Figure 11:
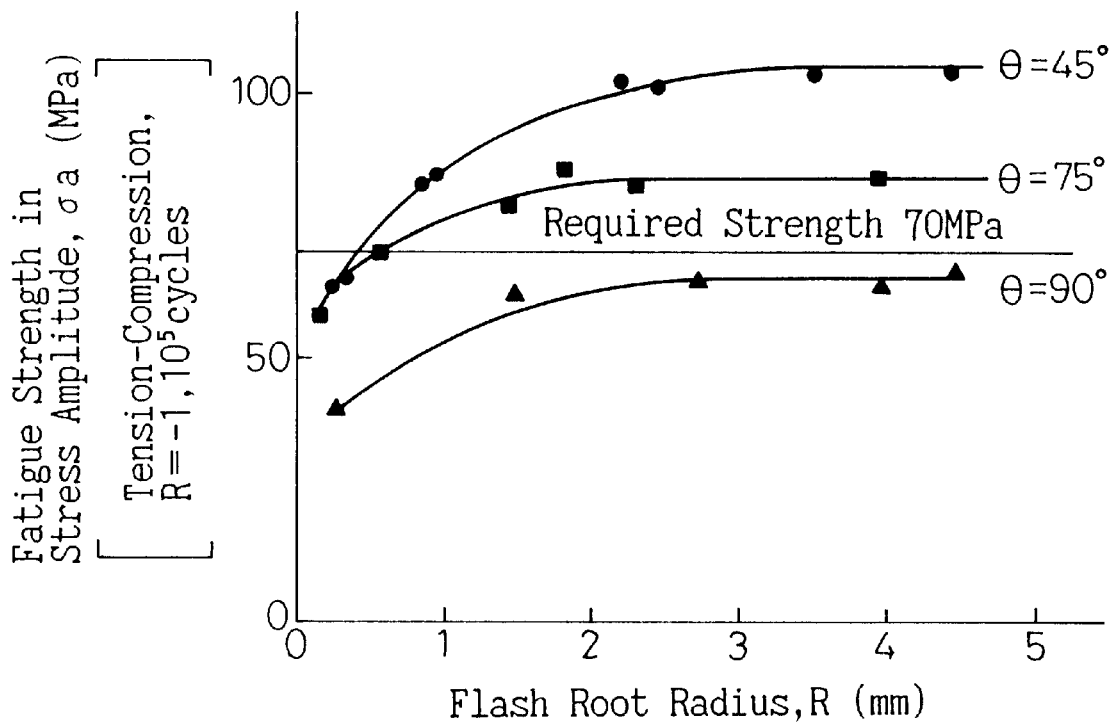
FIG. 11 is a graph showing the variation in fatigue strength as a function of the flash root radius, R, and the flash root angle, θ.

Studies were conducted on how the flash root radius R and the flash root angle θ influence the fatigue strength. FIG. 11 shows that, when the flash root angle θ equals 90 deg, the fatigue strength does not exceed 70 MPa even when the flash root radius is 0.5 mm or more. On the other hand, when the flash root angle is controlled to 75 deg or less, the fatigue strength exceeds the target value of 70 MPa when the flash root radius is 0.5 mm or more. This result also shows that the limitation of the flash root radius R of 0.5 mm or more and the flash root angle of 75 deg or less effectively improves the fatigue strength.

The influence of the ratio of the friction displacement/the wall thickness and the ratio of the upset pressure $P_2$/the friction pressure $P_1$ on the tensile strength of the friction-welded joint was studied. To this end, tips 6 and 7 were friction-welded to hollow circular cylindrical members 5 having machined dimensions of (1) an outer diameter of 52 mm, a wall thickness of 10 mm, (2) an outer diameter of 56 mm, a wall thickness of 12 mm, and (3) an outer diameter of 60 mm, a wall thickness of 8 mm.

Figure 12:
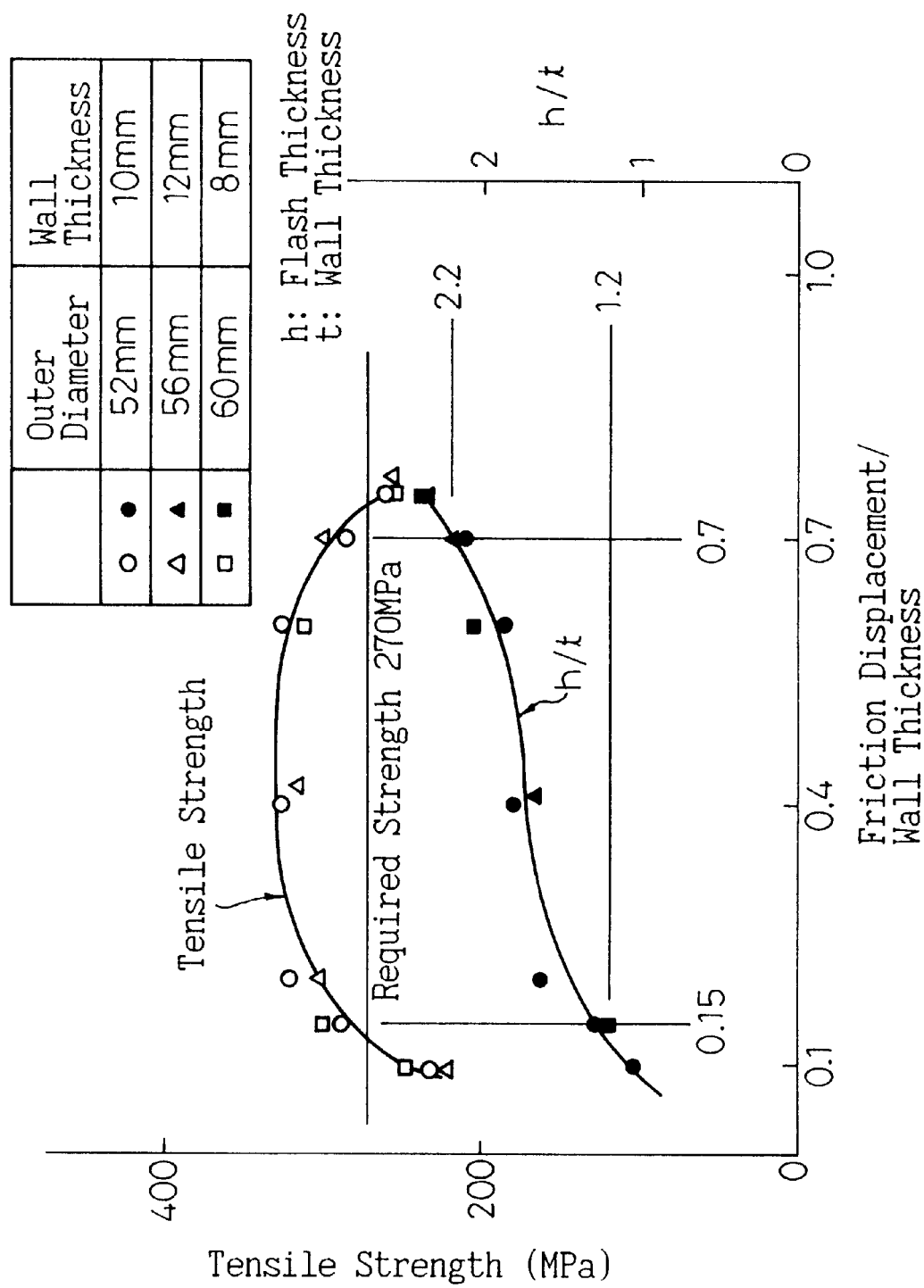
FIG. 12 is a graph showing the tensile strength (blank plots) and the ratio of flash thickness (h)/wall thickness (t) (solid plots) as a function of the ratio of friction displacement/wall thickness, respectively.

It can be seen from FIG. 12 that, when the ratio of the friction displacement/the wall thickness is within the range of 0.15 to 0.7, the friction-welded joint has a tensile strength of the target value of 270 MPa or more. The tensile strength is reduced when the ratio of the friction displacement/the wall thickness is either less than 0.15 or more than 0.7.

The ratio of the friction displacement/the wall thickness also has an influence on the size of the flash formed by friction welding. The flash size is represented by the flash thickness "h" and the wall thickness is denoted by "t" as shown in FIG. 2.

Referring to FIG. 12, the ratio h/t increases as the ratio of the friction displacement/the wall thickness increase as shown by the solid circular, triangular and square plots. However, when the ratio of the friction displacement/the wall thickness is 0.7 or less, h/t is 2.2 or less and formation of excessively large flashes is suppressed.

Referring to FIG. 13, when $P_2/P_1$ is 3.5 or less, the tensile strength exceeds the target value of 270 MPa or more. When $P_2/P_1$ is more than 3.5, the tensile strength sharply drops. On the other hand, when $P_2/P_1$ is less than 1.5, the upset pressure $P_2$ is extremely small and a softened, fluid region A is extruded as a flash, so that the flash root angle θ is more than 75 deg as shown by the solid circular, triangular and square plots. The joint having such a sharply rising flash has a fatigue strength not satisfying the target value of 70 MPa as shown in FIG. 10.

To summarize, the friction-welded joint has good fatigue strength and tensile strength when it has a flash root radius R of 0.5 mm or more and a flash root angle of 75 deg or less. A flash having a flash root radius of 0.5 mm or more and a flash root angle of 75 deg or less is obtained when an upset delay time of 0.4 to 0.8 sec is introduced, and at the same time, the upset displacement speed is controlled to within the range of 5.0 to 70.0 mm/sec. Moreover, the friction-welded joint has a further improved tensile strength, when, in addition to the above-specified parameters, the ratio of the friction displacement/the wall thickness is controlled to within the range of 0.15 to 0.7, and at the same time, the ratio of the upset pressure $P_2$/the friction pressure $P_1$ is controlled to within the range of 1.5 to 3.5.

Although the present invention was described in relation to a specific aluminum alloy composition in this example, the present invention applies to any aluminum alloy composition which is suitably subject to forging, extrusion or other hot or cold working or forming processes to prepare hollow members to be friction-welded. To produce the vehicle torque rod, aluminum alloy compositions such as JIS A6061, 6082, 2014, and 7075 grades may be preferably used because of good forgeability and extrudability as well as good tensile and fatigue properties.

As described herein, the present invention controls the root shape of a flash extruded from the base material by introducing an upset delay time interposed between termination of the friction step and commencement of the upset step and by controlling the upset displacement speed. This provides a friction-welded joint having a tensile strength and a fatigue strength which are comparable with those of TIG- or MIG-welded joints and enables aluminum alloy hollow members to be produced by friction welding in replacement for TIG or MIG.

What is claimed is:

1. A process of friction-welding aluminum alloy hollow members, comprising the steps of:
    making aluminum alloy hollow members abut each other end to end;
    causing friction between the abutting ends by relative rotation between said ends to generate friction heat, thereby heating the abutting ends to a welding temperature; and
    upsetting the heated, abutting ends by pressing said ends against each other to extrude a flash therefrom, wherein:
        said flash has a flash root radius of 0.5 mm or more and a flash root angle of 75° or less, said flash root radius and said flash root angle being defined in a plane which contains an axis of said pressing, said flash root radius being a radius of curvature of a surface of the flash in a portion rising from said members and said flash root angle being an acute angle between said surface of the flash and said axis of the pressing.

2. A process according to claim 1, wherein an upset delay time is interposed between completion of said step of causing friction and commencement of said step of upsetting so as to achieve said flash root radius and said flash root angle.

3. A process of friction-welding aluminum alloy hollow members, comprising the steps of:
    making said members abut each other end to end;
    causing friction between the abutting ends by relative rotation between said ends to generate friction heat, thereby heating the abutting ends to a welding temperature; and
    upsetting the heated, abutting ends by pressing said ends against each other to extrude a flash therefrom, wherein:
        an upset delay time of from 0.4 to 0.8 sec is interposed between completion of said step of causing friction and commencement of said step of upsetting and said step of upsetting includes applying an upset pressure to said members at an upset displacement speed of from 5.0 to 70.0 mm/sec so as to form a flash having a flash root radius of 0.5 mm or more and a flash root angle of 75° or less, said flash root radius and said flash root angle being defined in a plane which contains an axis of said pressing, said flash root radius being a radius of curvature of a surface of the flash in a portion rising from said members and said flash root angle being an acute angle between said surface of the flash and said axis of the pressing.

4. A process according to claim 3, wherein said step of causing friction between the abutting ends is carried out at a friction pressure of 14.7 to 58.8 MPa, a ratio of a friction displacement to a wall thickness of said members of 0.15 to 0.7 and a revolution of 500 to 3000 rpm and said step of upsetting includes application of an upset pressure of 1.5 to 3.5 times said friction pressure.

5. A friction-welded joint of aluminum alloy hollow members, wherein said joint is produced by a process according to claim 3 and has a flash having a flash root radius of from 0.5 mm or more and a flash root angle of from 75° or less.

6. A vehicle torque rod of an aluminum alloy comprising a hollow circular cylinder and tips having a hollow circular end, wherein said tips are respectively bonded to both ends of said hollow circular cylinder at said hollow circular ends of said tips by a process of friction welding according to claim 1.

7. A vehicle propeller shaft of an aluminum alloy comprising a hollow circular cylinder and tips having a hollow circular end, wherein said tips are respectively bonded to both ends of said hollow circular cylinder at said hollow circular ends of said tips by a process of friction welding according to claim 1.

8. A vehicle link, of an aluminum alloy comprising a hollow circular cylinder and tips having a hollow circular end, wherein said tips are respectively bonded to both ends of said hollow circular cylinder at said hollow circular ends of said tips by a process of friction welding according to claim 1.

9. A friction-welded joint of aluminum alloy hollow members, wherein said joint is produced by a process according to claim 4 and has a flash having a flash root radius of from 0.5 mm or more and a flash root angle of from 75° or less.

10. A vehicle torque rod of an aluminum alloy comprising a hollow circular cylinder and tips having a hollow circular end, wherein said tips are respectively bonded to both ends of said hollow circular cylinder at said hollow circular ends of said tips by a process of friction welding according to claim 2.

11. A vehicle torque rod of an aluminum alloy comprising a hollow circular cylinder and tips having a hollow circular end, wherein said tips are respectively bonded to both ends of said hollow circular cylinder at said hollow circular ends of said tips by a process of friction welding according to claim 3.

12. A vehicle torque rod of an aluminum alloy comprising a hollow circular cylinder and tips having a hollow circular end, wherein said tips are respectively bonded to both ends of said hollow circular cylinder at said hollow circular ends of said tips by a process of friction welding according to claim 4.

13. A vehicle propeller shaft of an aluminum alloy comprising a hollow circular cylinder and tips having a hollow circular end, wherein said tips are respectively bonded to both ends of said hollow circular cylinder at said hollow circular ends of said tips by a process of friction welding according to claim 2.

14. A vehicle propeller shaft of an aluminum alloy comprising a hollow circular cylinder and tips having a hollow circular end, wherein said tips are respectively bonded to both ends of said hollow circular cylinder at said hollow circular ends of said tips by a process of friction welding according to claim 3.

15. A vehicle propeller shaft of an aluminum alloy comprising a hollow circular cylinder and tips having a hollow circular end, wherein said tips are respectively bonded to both ends of said hollow circular cylinder at said hollow circular ends of said tips by a process of friction welding according to claim 4.

16. A vehicle link, of an aluminum alloy comprising a hollow circular cylinder and tips having a hollow circular end, wherein said tips are respectively bonded to both ends of said hollow circular cylinder at said hollow circular ends of said tips by a process of friction welding according to claim 2.

17. A vehicle link, of an aluminum alloy comprising a hollow circular cylinder and tips having a hollow circular end, wherein said tips are respectively bonded to both ends of said hollow circular cylinder at said hollow circular ends of said tips by a process of friction welding according to claim 3.

18. A vehicle link, of an aluminum alloy comprising a hollow circular cylinder and tips having a hollow circular end, wherein said tips are respectively bonded to both ends of said hollow circular cylinder at said hollow circular ends of said tips by a process of friction welding according to claim 4.

* * * * *